(12) United States Patent
Surles et al.

(10) Patent No.: US 11,611,872 B2
(45) Date of Patent: Mar. 21, 2023

(54) METHODS AND SYSTEMS FOR A SELF-PROVISIONING DEVICE

(71) Applicant: ShopperTrak RCT LLC, Chicago, IL (US)

(72) Inventors: Kelly Surles, Chicago, IL (US); Spencer Neilan, Chicago, IL (US); Zafar Mohammad Haq, Arlington Heights, IL (US); William A. Knopf, Jr., Aurora, IL (US); William Edward Dubois, Orland Park, IL (US)

(73) Assignee: ShopperTrak RCT LLC, Chicago, IL (US)

( * ) Notice: Subject to any disclaimer, the term of this patent is extended or adjusted under 35 U.S.C. 154(b) by 192 days.

(21) Appl. No.: 16/904,171

(22) Filed: Jun. 17, 2020

(65) Prior Publication Data

US 2021/0099861 A1 Apr. 1, 2021

Related U.S. Application Data

(60) Provisional application No. 62/908,321, filed on Sep. 30, 2019.

(51) Int. Cl.
*H04W 8/24* (2009.01)
*G06F 8/65* (2018.01)
(Continued)

(52) U.S. Cl.
CPC .............. *H04W 8/245* (2013.01); *G06F 8/65* (2013.01); *G06F 9/4401* (2013.01);
(Continued)

(58) Field of Classification Search
CPC ..... H04W 8/245; H04W 12/03; H04W 12/06; G06F 8/65; G06F 9/4401; G06F 9/44505
See application file for complete search history.

(56) References Cited

U.S. PATENT DOCUMENTS

| 9,071,583 | B2 * | 6/2015 | Yang | H04L 63/0869 |
| 2007/0109100 | A1 * | 5/2007 | Jett | H04L 12/189 |
| | | | | 340/9.1 |

(Continued)

FOREIGN PATENT DOCUMENTS

| EP | 1554857 A2 | 7/2005 |
| WO | 2018157247 A1 | 9/2018 |

OTHER PUBLICATIONS

International Search Report and Written Opinion for International Patent Application No. PCT/US2020/053104, dated Nov. 30, 2020 (248 pages).

(Continued)

*Primary Examiner* — Jaweed A Abbaszadeh
*Assistant Examiner* — Gayathri Sampath
(74) *Attorney, Agent, or Firm* — ArentFox Schiff LLP

(57) ABSTRACT

In an aspect, the present disclosure includes a method, apparatus, and non-transitory computer readable medium for wireless communications for initiating, by a provisioning system, a provisioning procedure to configure and update a device that initiates an initial connection to a wireless network based on a unique identifier of the device; and establishing, by the provisioning system, a secure socket with the device based on the provisioning procedure.

19 Claims, 14 Drawing Sheets

(51) Int. Cl.
*G06F 9/4401* (2018.01)
*G06F 9/445* (2018.01)
*G07C 9/00* (2020.01)
*H04W 12/03* (2021.01)
*H04W 12/06* (2021.01)
*G06Q 20/20* (2012.01)
*G06Q 50/28* (2012.01)
*G06N 20/00* (2019.01)
*G07G 1/00* (2006.01)
*H04L 9/40* (2022.01)
*H04L 67/125* (2022.01)
*H04L 41/082* (2022.01)

(52) U.S. Cl.
CPC ........... *G06F 9/44505* (2013.01); *G07C 9/00* (2013.01); *H04W 12/03* (2021.01); *H04W 12/06* (2013.01); *G06Q 20/202* (2013.01); *G06Q 20/203* (2013.01); *G06Q 50/28* (2013.01)

(56) References Cited

U.S. PATENT DOCUMENTS

| | | |
|---|---|---|
| 2008/0205339 A1 | 8/2008 | Brophy |
| 2009/0276620 A1* | 11/2009 | McCarron ............. G06F 3/0622 380/279 |
| 2010/0099432 A1 | 4/2010 | Glover et al. |
| 2013/0007437 A1* | 1/2013 | Shroni ...................... G06F 8/65 713/2 |
| 2015/0081837 A1 | 3/2015 | Bernier et al. |
| 2016/0124868 A1 | 5/2016 | Logue |

OTHER PUBLICATIONS

Schulz et al., "Boot Attestation: Secure Remote Reporting with Off-The-Shelf IoT Sensors," ESORICS, Part II, LNCS vol. 10493, pp. 437-455 (2017).

\* cited by examiner

METHODS AND SYSTEMS FOR A SELF-PROVISIONING DEVICE

CROSS-REFERENCE TO RELATED APPLICATION(S)

The present application claims benefit of U.S. Provisional Application No. 62/908,321 entitled "METHODS AND SYSTEMS FOR A SELF-PROVISIONING DEVICE" filed Sep. 30, 2019, and is assigned to the assignee hereof and hereby expressly incorporated by reference herein.

BACKGROUND

The present disclosure relates to monitoring retail locations, and more particularly to a system which can automatically and dynamically provision devices at a location of installation.

Security device manufacturers spend a lot of time and resources on their shipping team, since they have to provision the devices on site, before they are shipped, and input media access control (MAC) address information to associate a specific device with a specific store. Retailers also use time and/or resources because the type of the device used cannot be determined at the point of installation, increasing error and re-shipments.

Thus, there is a need in the art for improvements in provisioning devices at a location of installation. In particular, there is a need for systems and methods for provisioning devices in an easy and more efficient manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including initiating, by a provisioning system, a provisioning procedure to configure and update a device based on the device initiating an initial connection to a wireless network; receiving, by the provisioning system from the device, a unique identifier of the device; transmitting, by the provisioning system to the device, a device information request message; receiving, by the provisioning system from the device, a device information message based on the device information request message; transmitting, by the provisioning system to the device, at least one of a new software file and a new configuration file in response to receiving the device information message; receiving, by the provisioning system from the device, an acknowledgement receipt message in response to successfully transmitting the at least one of the new software file and the new configuration file; and transmitting, by the provisioning system to the device, a validation message corresponding to the at least one of the new software file and the new configuration file; and establishing, by the provisioning system, a secure socket with the device based on the provisioning procedure.

In a further example, an apparatus for wireless communication is provided that includes a transceiver, a memory configured to store instructions, and one or more processors communicatively coupled with the transceiver and the memory. The one or more processors are configured to execute the instructions to initiate, by a provisioning system, a provisioning procedure to configure and update a device based on the device initiating an initial connection to a wireless network; receive, by the provisioning system from the device, a unique identifier of the device; transmit, by the provisioning system to the device, a device information request message; receive, by the provisioning system from the device, a device information message based on the device information request message; transmit, by the provisioning system to the device, at least one of a new software file and a new configuration file in response to receiving the device information message; receiving, by the provisioning system from the device, an acknowledgement receipt message in response to successfully transmitting the at least one of the new software file and the new configuration file; transmit, by the provisioning system to the device, a validation message corresponding to the at least one of the new software file and the new configuration file; and establish, by the provisioning system, a secure socket with the device based on the provisioning procedure.

In another aspect, an apparatus for wireless communication is provided that includes means for initiating, by a provisioning system, a provisioning procedure to configure and update a device based on the device initiating an initial connection to a wireless network; means for receiving, by the provisioning system from the device, a unique identifier of the device; means for transmitting, by the provisioning system to the device, a device information request message; means for receiving, by the provisioning system from the device, a device information message based on the device information request message; means for transmitting, by the provisioning system to the device, at least one of a new software file and a new configuration file in response to receiving the device information message; means for receiving, by the provisioning system from the device, an acknowledgement receipt message in response to successfully transmitting the at least one of the new software file and the new configuration file; means for transmitting, by the provisioning system to the device, a validation message corresponding to the at least one of the new software file and the new configuration file; and means for establishing, by the provisioning system, a secure socket with the device based on the provisioning procedure.

In yet another aspect, a non-transitory computer-readable medium is provided including code executable by one or more processors to initiate, by a provisioning system, a provisioning procedure to configure and update a device based on the device initiating an initial connection to a wireless network; receive, by the provisioning system from the device, a unique identifier of the device; transmit, by the provisioning system to the device, a device information request message; receive, by the provisioning system from the device, a device information message based on the device information request message; transmit, by the provisioning system to the device, at least one of a new software file and a new configuration file in response to receiving the device information message; receiving, by the provisioning system from the device, an acknowledgement receipt message in response to successfully transmitting the at least one of the new software file and the new configuration file; transmit, by the provisioning system to the device, a validation message corresponding to the at least one of the new software file and the new configuration file; and establish, by the provisioning system, a secure socket with the device based on the provisioning procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The present disclosure provides systems and methods for provisioning a device. The disclosure provides a system that automatically and dynamically provision devices at the location of installation (e.g., remotely).

For example, a device can come from the factory in an initial 'default' state. Once the device is connected to the internet at a retailer, the device can check in to the system, and the system determines which firmware and which configuration settings the device needs. The system determines this based on the MAC address of the device and the location of a store. The system performs the updates on the device. The system also attempts to verify that the provisioning was successful. If the device was provisioned as a lead device, the device will check in again, and the system will then check the firmware version of the device and configuration settings to ensure that the firmware and configuration settings are correct. If the device was provisioned as a non-lead device, the non-lead device will not check in, but when the parent lead device checks in, the system will check (via the lead device) the non-leads firmware version and configuration settings to see if they are correct.

Although described in relation to people counter devices (PCD), pedestals, RFID readers, cameras, etc. communicating over Ethernet networking systems, the described aspects are not limited to just Ethernet based people counter applications. This described aspects may be employed in any networking system including but not limited to wireless networking such as ZigBee, WiFi, BLE, etc. as well as cellular networking systems such as GSM/GPRS etc. and the 5G networking systems and more specifically, to PCDs connected to these networking systems. Therefore the device can be expanded to not just use MAC address as an identifier but other networking system unique identifiers as well.

For example, in an aspect, the present disclosure includes a method, apparatus, and non-statutory computer readable medium for wireless communications for initiating, by a provisioning system, a provisioning procedure to configure and update a device that initiates an initial connection to a wireless network based on a unique identifier of the device; and establishing, by the provisioning system, a secure socket with the device based on the provisioning procedure.

Figure 1:
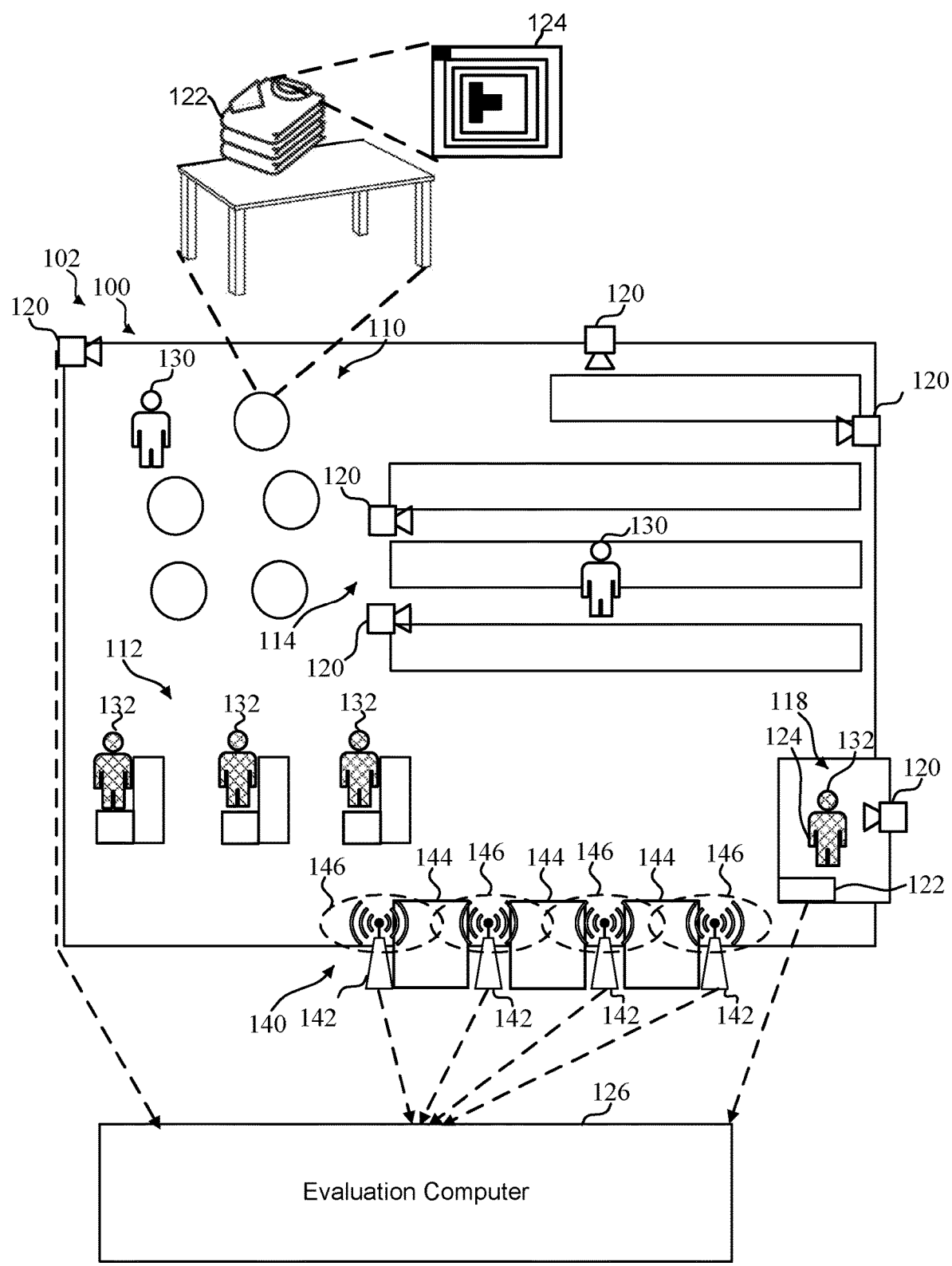
FIG. 1 is a schematic diagram of an example retail location including a first example of a security system.
Figure 2:
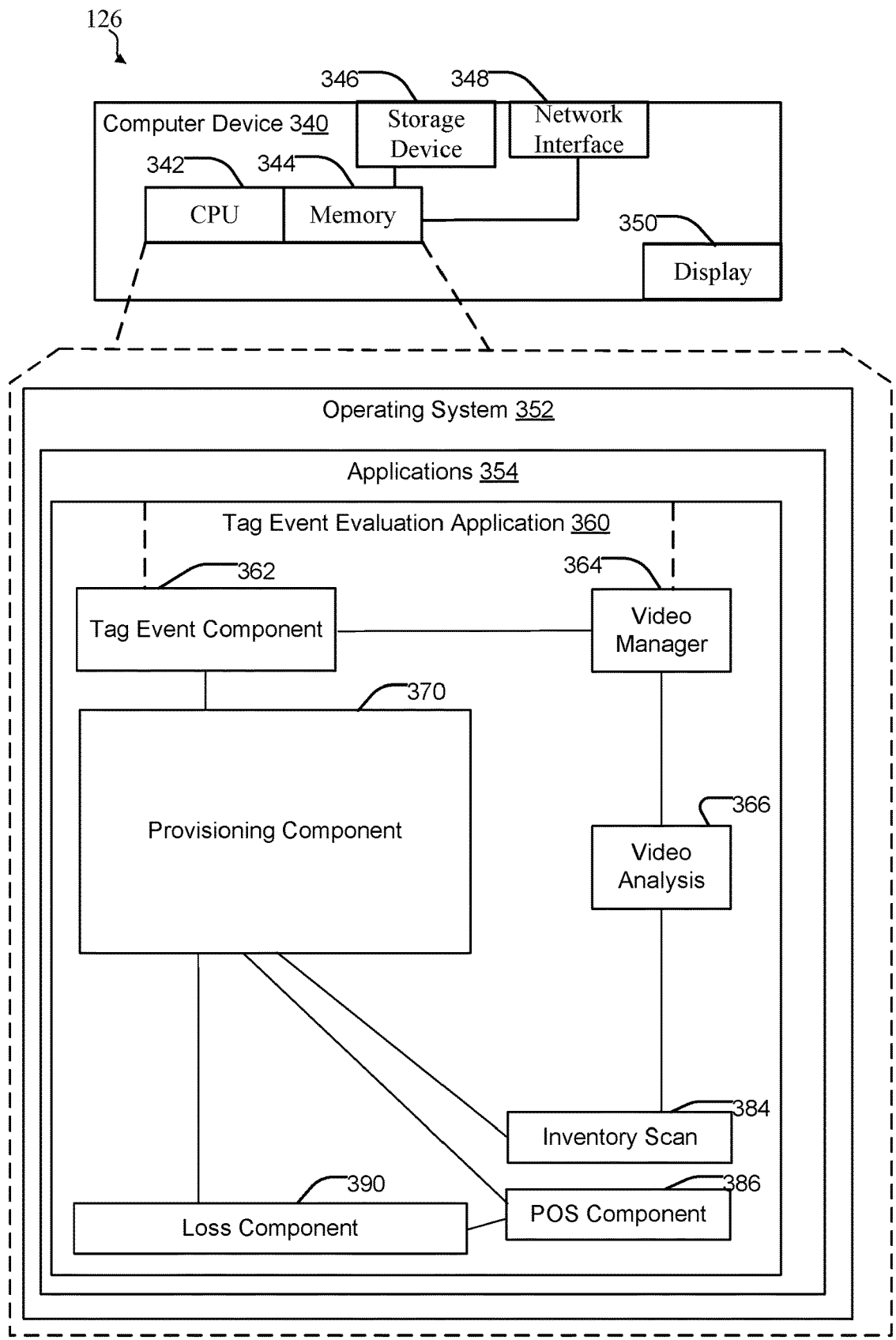
FIG. 2 is a diagram of an example computer system implementing a provisioning system.

Referring now to FIG. 1, an example retail location 100 includes multiple regions where tagged products may be located. For example, the retail location 100 may include an open display area 110, a front end 112, aisles 114, and a security room 118. Customers 130 may be located within the different regions. Workers 132 may be stationed at locations such as check out registers and the security room 118. A person of skill in the art would understand that the disclosed systems and methods are applicable to a variety of retail locations and the present disclosure is not limited to the example retail location or areas.

As discussed above, retailers (e.g., apparel retailers) have deployed security tags such as radio frequency identification (RFID) systems in stores to track product movements as they arrive at stores, are placed on display on the sales floor, and are sold. By adopting RFID, retailers are able to reduce the amount of time that the store employees spend counting the inventory (e.g., manually counting inventor that is on the floor and in stock room), as well as increase merchandise visibility within each store, thereby enabling shoppers in the store and online to find what they seek. RFID uses radio waves to read and capture information stored on a tag attached to an object such as a good, product, or merchandise. Additionally, RFID tags may be used with a security system to detect inventory changes and possible loss events. For example, RFID tags may be read by an exit system to determine whether a tagged item 122 is exiting the retail location. A security tag (e.g., tag 124) can be read from up to several feet away and does not need to be within direct line-of-sight of the reader to be tracked. Although the present disclosure refers to RFID tags, the techniques disclosed herein may be applicable to other types of security tags (e.g., electronic article surveillance (EAS) tags).

An RFID system may be made up of two parts: a tag or label (e.g., EPC tag 124) and a reader (e.g., exit system 140). RFID tags (which may also be referred to as labels) are embedded with an RFID transmitter and a receiver. The RFID component on the tags may include a microchip that stores and processes information, and an antenna to receive and transmit signals. The EPC tag may further contain the specific serial number for each specific object (e.g., an electronic product code (EPC)). For example, in one implementation, an EPC tag may include multiple memory banks such as a reserved memory, EPC memory, tag identification (TID) memory, and user memory. The reserved memory bank may include an access password and a kill password. The EPC memory may include the EPC, a protocol control, and a cyclic redundancy check value. The TID memory may include a tag identification. The user memory may store custom data.

To read the information encoded on an EPC tag 124, a two-way radio transmitter-receiver called an interrogator or reader (e.g., exit system 140) emits a signal to the EPC tag using the antenna (e.g., internal antennas). The reader 140 may apply filtering to indicate what memory bank the EPC tag 124 should use to respond to the emitted signal. The EPC tag 124 may respond with the information (e.g., EPC value or serial number) written in the memory bank. The EPC tag data set may include any information stored on the EPC tag 124 as well as information about reading the EPC tag 124. For example, the EPC tag data set may include: a timestamp, a location, a signal transmission power, a received signal strength indication (RSSI), and an identifier of the RFID reader 140. For purposes of this disclosure, the terms, the EPC tag and RFID tag may be used interchangeably. The EPC tag 124 may be a passive tag or a battery powered EPC tag. A passive RFID tag may use the RFIC interrogator or receiver's 140 radio wave energy to relay the stored information back to the interrogator. In contrast, a battery powered EPC tag 124 may be embedded with a battery that powers the relay of information.

The security system 102 may include an exit system 140, multiple cameras 120, and an evaluation computer 126. The exit system 140 may include multiple sensors 142 located near exits 144. For example, the example retail location 100 may include three exits 144 that are relatively narrow. The sensors 142 may be located on each side of the exits 144. For example, in an implementation, the sensors 142 may include at least one RFID reader including an antenna that generates a tag detection field 146. Generally, the sensors 142 may be configured (e.g., by setting a power level) such that the tag detection fields 146 cover the exits 144 to detect tags moving through the exits. Although the sensors 142 are illustrated as pedestals adjacent the exits 144, sensors 142 may be located on the floor and/or the ceiling. The sensors 142 may include additional sensors that may produce measurements other than RF measurements. For example, the sensors 142 may include infrared (IR) sensors, inertial sensors, magnetic sensors, or cameras. An exclusion area may be defined near the exit system 140. Tagged products may generally be excluded from the exclusion area to prevent reading by the exit system 140.

The cameras 120 may be located in or near the exit system 140 or may be located in other regions of retail location 100. Each camera 120 may be a digital video camera such as a security camera. The multiple cameras 120 may be located throughout the retail location 100. Each of the cameras 120 may provide a constant video feed of one or more of the areas of the retail location 100. The cameras 120 may generally be oriented in a default direction to capture a particular view of the retail location 100 where activity is expected, but one or more of the cameras 120 may be mounted on a gimbal that allows rotation and panning of the respective camera 120. For example, the security system 102 may move a camera 120 to maintain the field of view of the camera 120 on a customer 130. In another aspect, the security system 102 may allow manual control over one or more cameras 120. In an aspect, the security system 102 may be integrated with one or more other systems, and the video feed of the cameras 120 may be used for multiple purposes.

The evaluation computer 126 may be a computer device programmed to evaluate at least exit system measurements from the sensors 142. The evaluation computer 126 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing exist system measurements.

Figure 3:
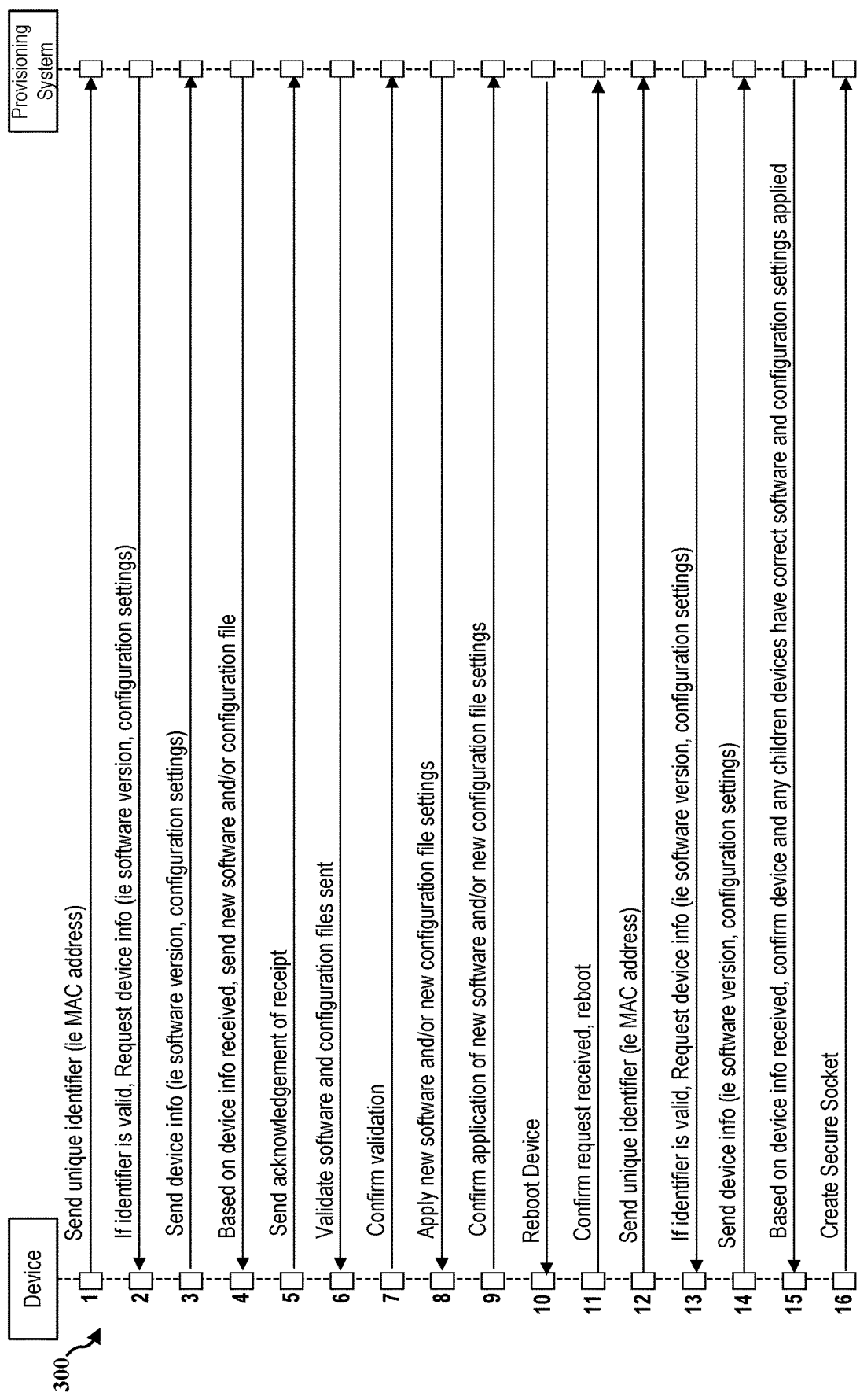
FIG. 3 is a diagram illustrating an example of a message flow between a device and a provisioning system during a provisioning procedure of the device.
Figure 4:
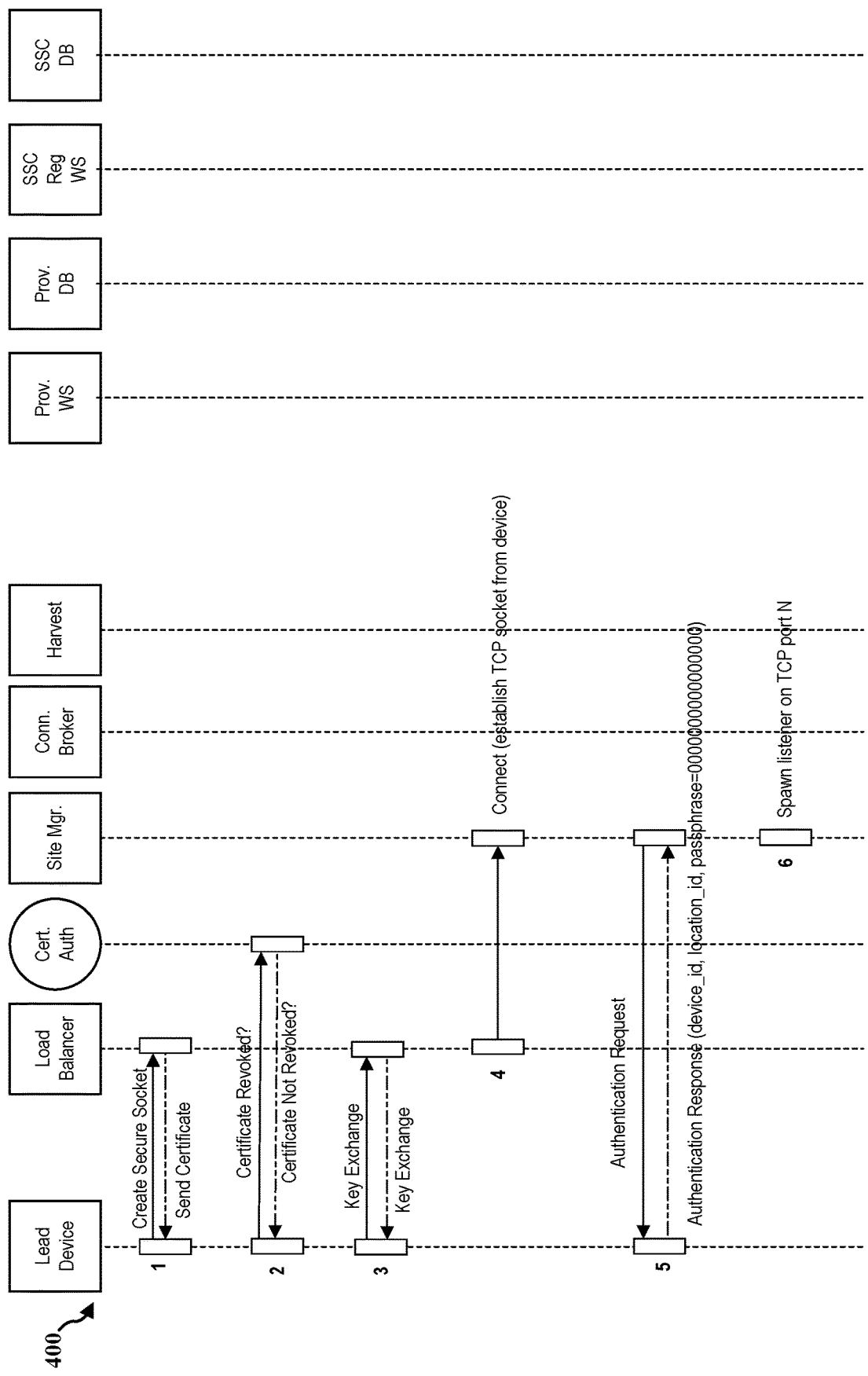
FIGS. 4-11 are diagrams illustrating another example of message flows between a device and a provisioning system during a provisioning procedure of the device.
Figure 5:
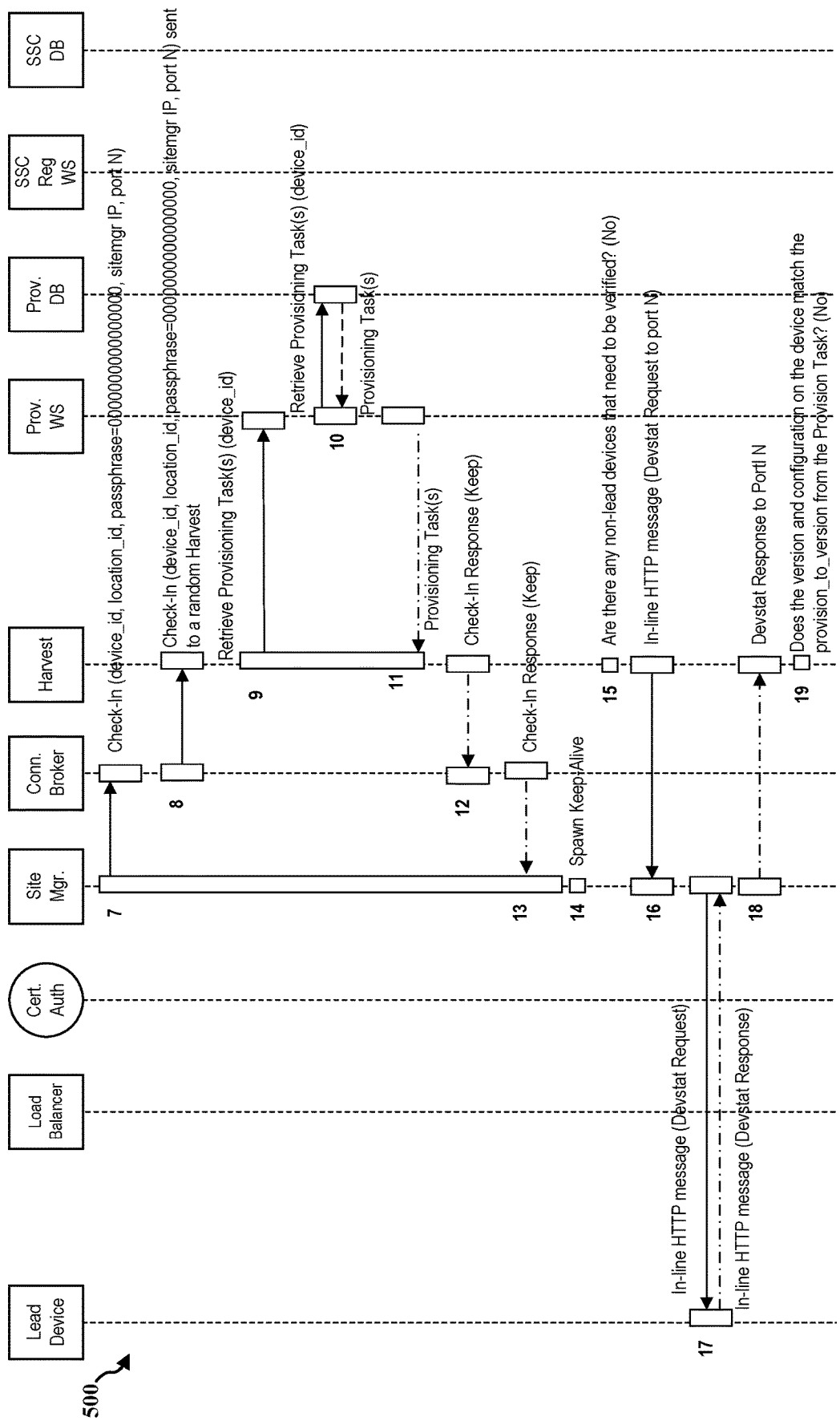
Figure 6:
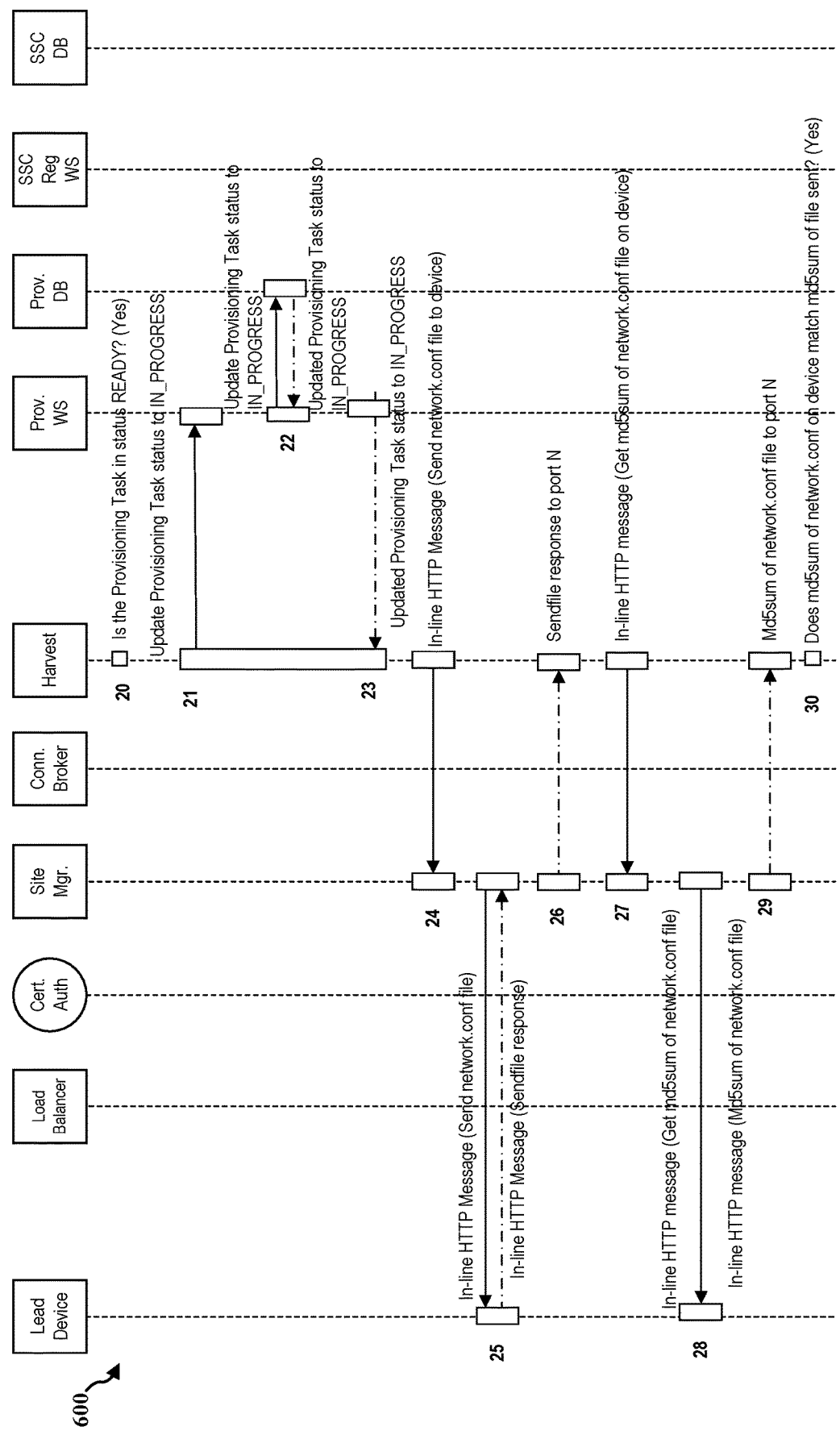
Figure 7:
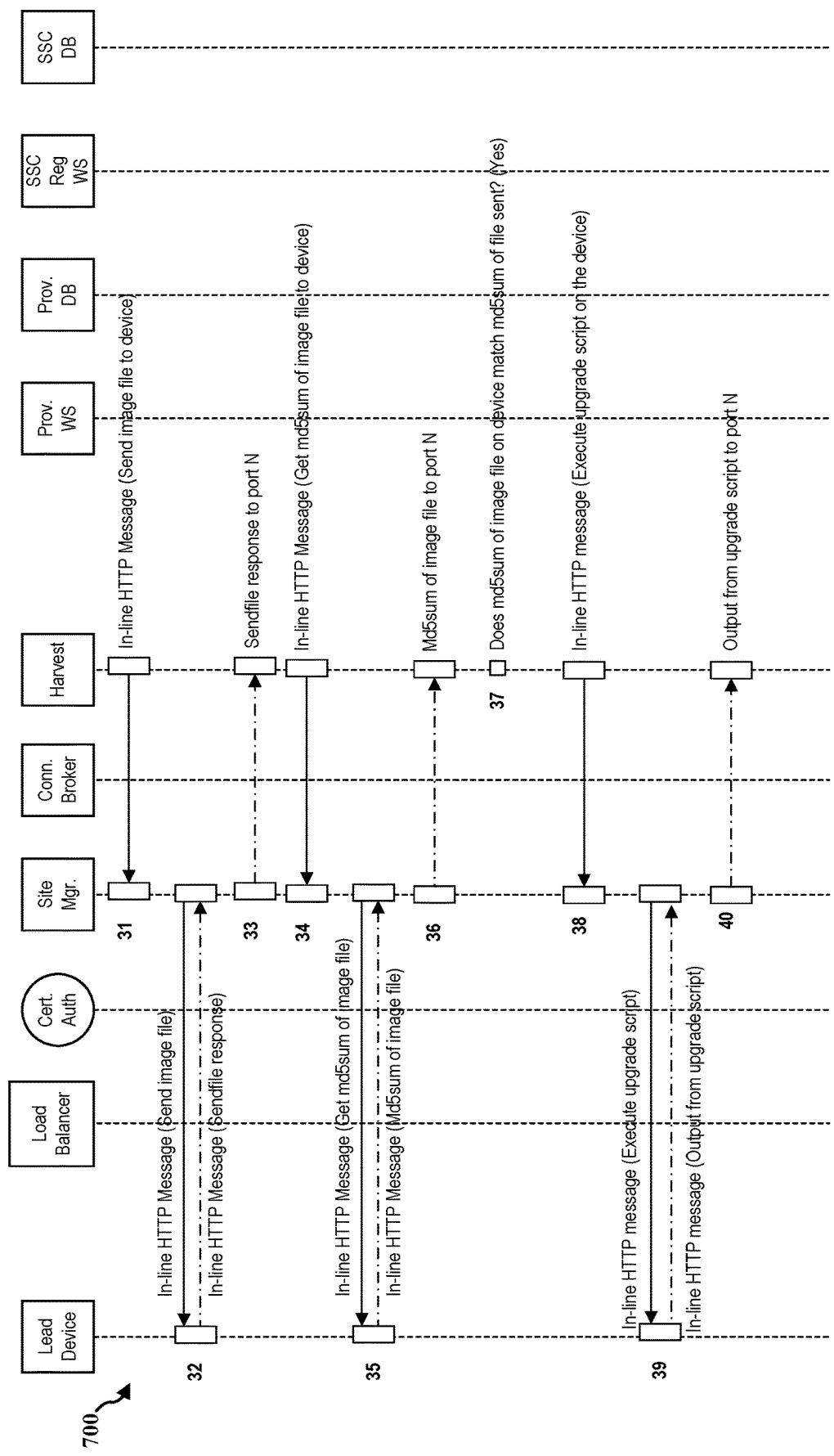
Figure 8:
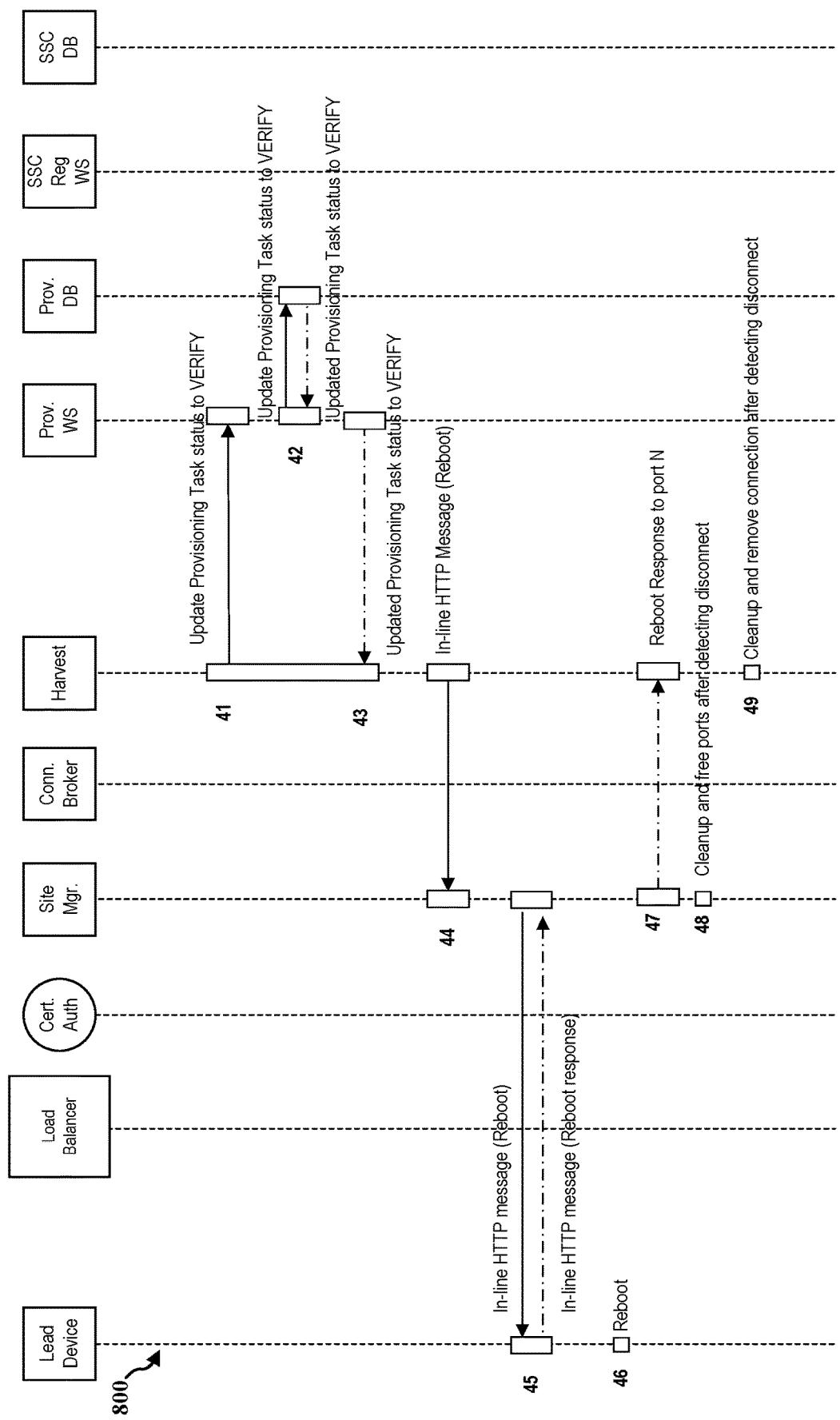
Figure 9:
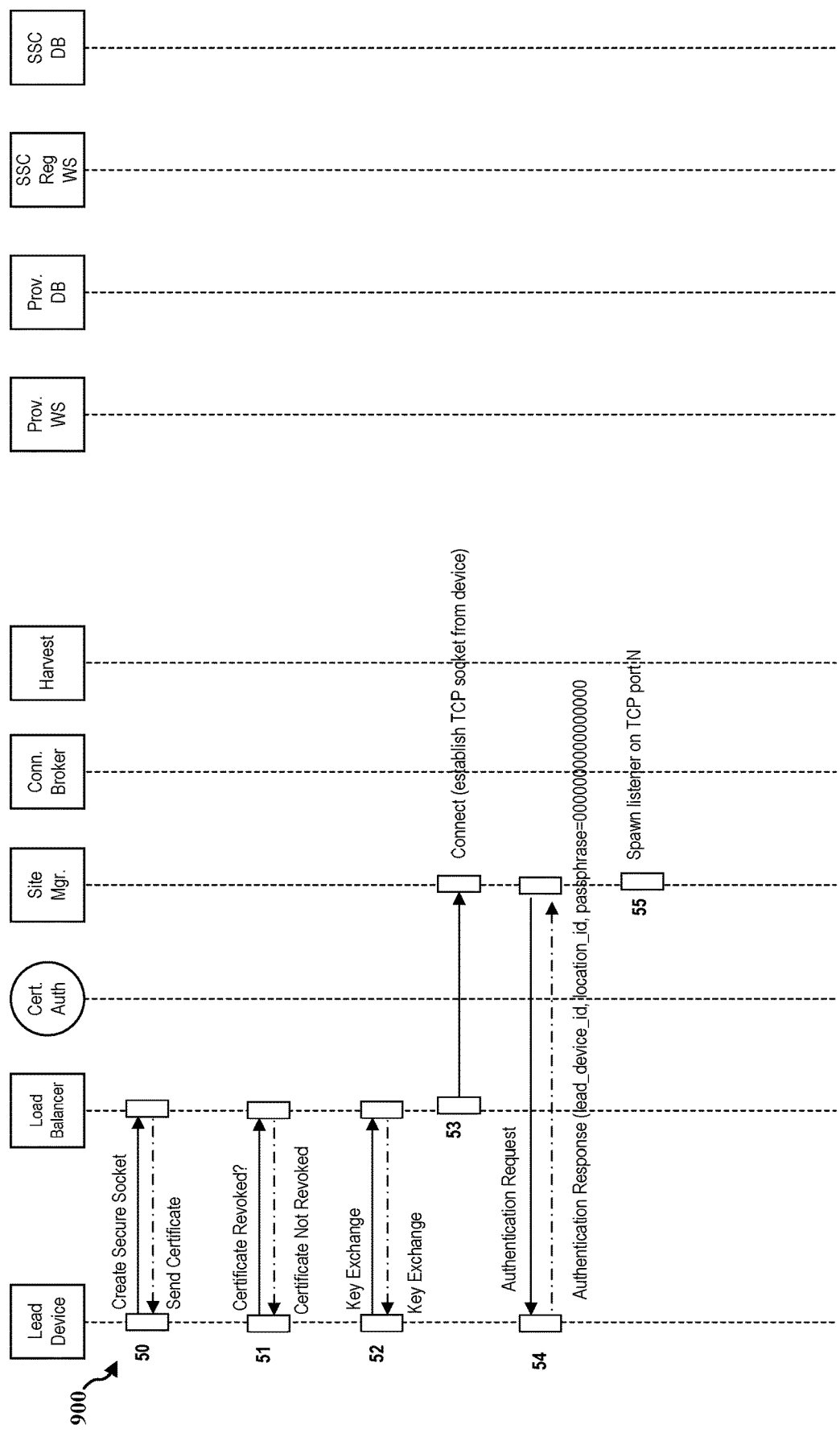
Figure 10:
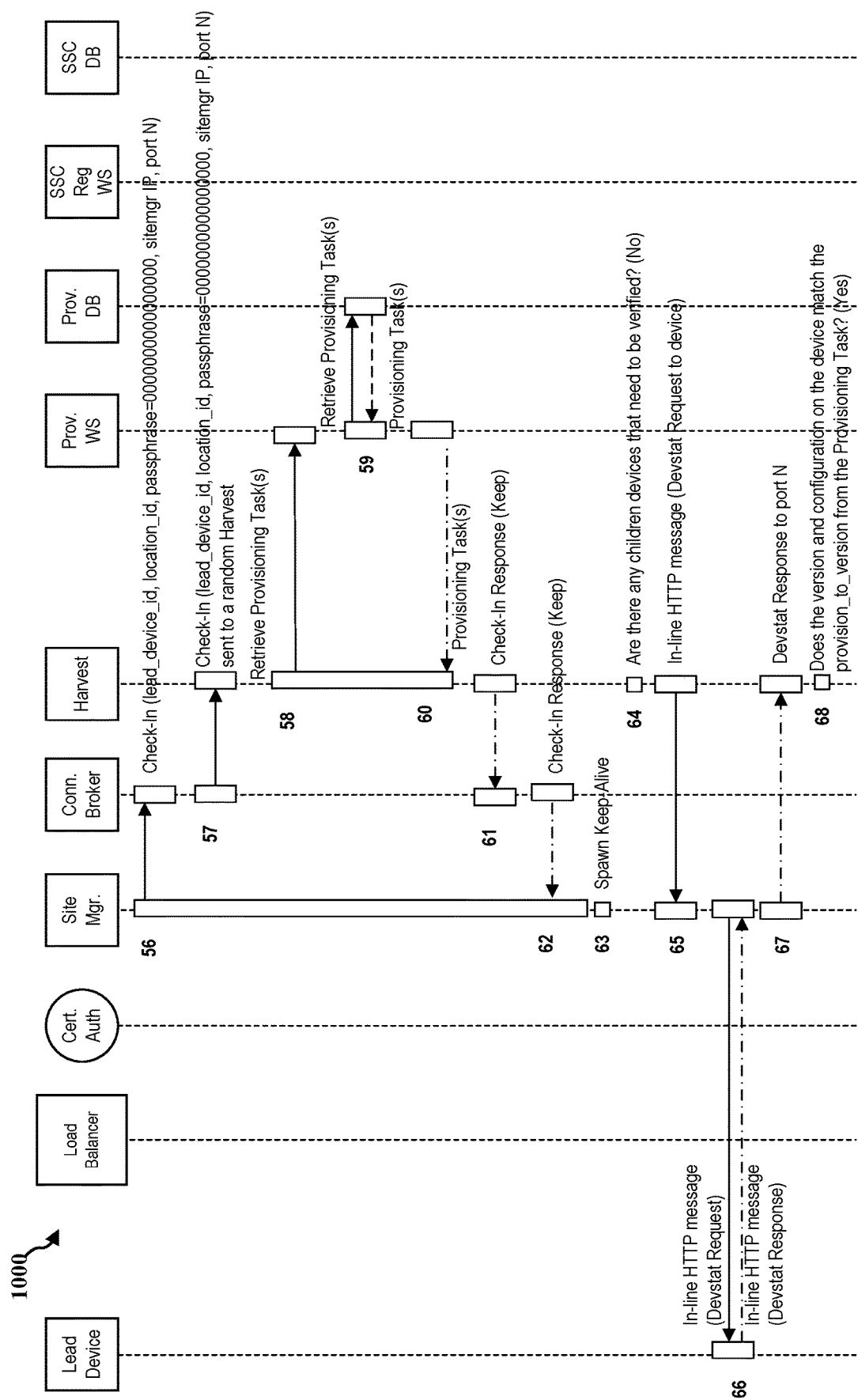
Figure 11:
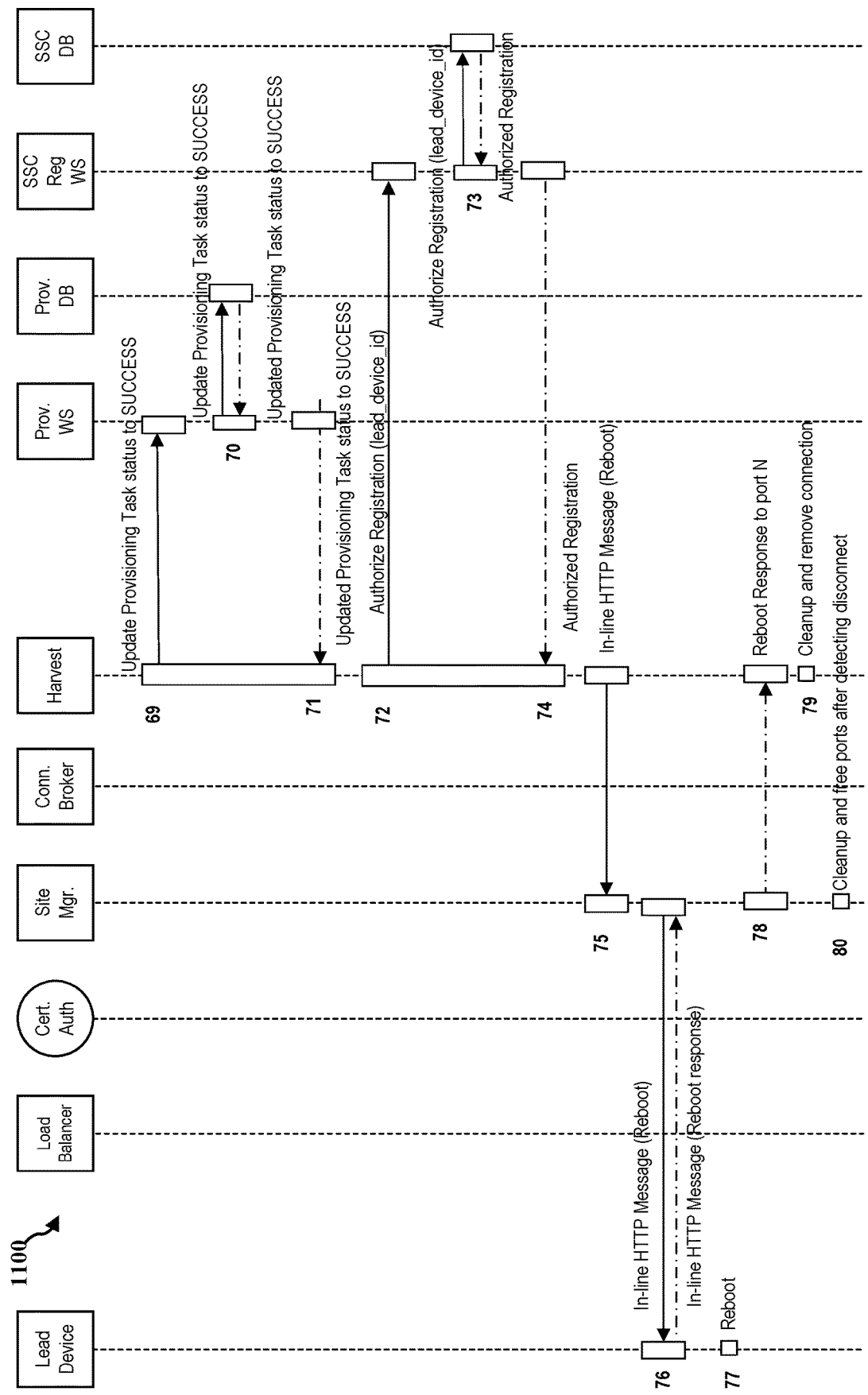

Turning to FIG. 3, an example computer device 340 may be used to implement the evaluation computer 126. The computer device 340 may include a central processing unit (CPU) 342 that executes instructions stored in memory 344. For example, the CPU 342 may execute an operating system 352 and one or more applications 354, which may include a tag event evaluation application 360. The computer device 340 may include a storage device 346 for storing data (e.g., exit system measurements and video data streams). The computer device 340 may also include a network interface 348 for communication with external devices via a network. For example, the computer device 340 may communicate with the cameras 120.

The computer device 340 may include a display 350. The display 350 may be, for example, a computer monitor and/or a touch-screen. The display 350 may provide information to an operator and allow the operator to configure the computer device 340.

Memory 344 may be configured for storing data and/or computer-executable instructions defining and/or associated with an operating system 352 and/or application 354, and CPU 342 may execute operating system 352 and/or application 354. Memory 344 may represent one or more hardware memory devices accessible to computer device 340. An example of memory 344 can include, but is not limited to, a type of memory usable by a computer, such as random access memory (RAM), read only memory (ROM), tapes, magnetic discs, optical discs, volatile memory, non-volatile memory, and any combination thereof. Memory 344 may store local versions of applications being executed by CPU 342. In an implementation, the memory 344 may include a storage device, which may be a non-volatile memory.

The CPU 342 may include one or more processors for executing instructions. An example of CPU 342 can include, but is not limited to, any processor specially programmed as described herein, including a controller, microcontroller, application specific integrated circuit (ASIC), field programmable gate array (FPGA), system on chip (SoC), or other programmable logic or state machine. The CPU 342 may include other processing components such as an arithmetic logic unit (ALU), registers, and a control unit. The CPU 342 may include multiple cores and may be able to process different sets of instructions and/or data concurrently using the multiple cores to execute multiple threads.

The operating system 352 may include instructions (such as applications 330) stored in memory 344 and executable by the CPU 342. The applications 354 may include a tag event application 360 configured to classify a tag detection event into a first tag status for the tag detection event based on application of weighting values to exit system measurements. In an aspect, the tag event evaluation application 360 may determine a second tag status of the tag after the tag detection event. For example, the tag event evaluation application may determine the second tag status based on a different input such as a point of sale (POS) system transaction, an inventory scan, video analysis, or manual entry. Additionally, the tag event evaluation application 360 may update weighting values using a machine-learning algorithm based on at least the first tag status and the second tag status.

The tag event evaluation application 360 may include a tag event component 362 that determines tag events detected at the exit system 140. The tag event component 362 may determine exit system measurements for the tag detection event. For example, the exit system measurements may include one or more properties read from a tag. The exit system measurements may include any information stored on the EPC tag 124 as well as information about reading the EPC tag 124. For example, the EPC tag data set may include: a timestamp, a location, a signal transmission power, a received signal strength indication (RSSI), a phase angle of the tag, and an identifier of the sensor 142. The exit system 140 may determine additional information that may be correlated with the EPC tag data and/or derived from multiple tag reads or other sensors. For instance, the cameras 120 may provide a video feed to a video manager 364 that counts people in the video and provides locations of tracked people. The additional information may be included in the exit system measurements. For example, the exit system measurements may include a number of tags read over time; the RSSI of the tag; a change in RSSI over time, frequency, or beam; a phase angle of the tag; a speed of the tag; a number of people between sensors of the exit system 140; a number of people in an exit area; a location history of a person associated with the tag; a duration of the tag being read; and a stock keeping unit (SKU) of the tag being read. The tag event component 362 may provide a tag event data set to the provisioning component 370 to classify the tag event into a tag status.

The provisioning component 370 may be a machine-learning classifier trained to classify the tag event data set to a tag status. The provisioning component 370 may be configured with a base configuration 372 including weighting values 374. The weighting values 374 may be different weights for respective elements of the tag event data set or weights of various nodes within a classifier (e.g., a support vector machine (SVM) or digital neural network (DNN)). In an aspect, the base configuration 372 may be configured based on a sample layout and an associated set of weighting values 374. For instance, multiple base configurations 372 may be developed based on testing of existing systems or laboratory tests. An operator or the security system 102 may select a sample layout that most closely resembles a retail location (e.g., example retail location 100 or example retail location 200), and the tag event evaluation application 360 may configure the provisioning component 370 with the weighting values 374 associated with the selected sample layout. In an aspect, the base configuration and/or weighting values may be referred to as a classifier or machine-learning model.

The tag event evaluation application 360 may include a loss component 390 that determines whether an inventory change event indicates a loss event. In an aspect, the loss component 390 may optionally receive input from the POS component 386. The loss component 390 may compare inventory change events to POS transactions to determine whether an inventory change event corresponds to a purchased item, or a loss (e.g., theft of an unpurchased item). The loss component 390 may generate a loss event output such as an alarm and/or a message to security personnel. The message may include any known information about the loss event including, for example, the tag EPC, the corresponding product, pictures, or video of the exit during the tag detection event.

FIG. 3 is a diagram 300 of a flowchart of provisioning a device. The communications may be performed by a device (e.g., the sensors 142), and a provisioning system (e.g., evaluation computer 126). In an aspect, diagram 400 includes steps 1-16 for provisioning the device and creating a secure socket. For example, the device may engage in wireless communications with the provisioning system upon initialization in order to establish the secure socket.

FIGS. 4-11 are diagrams 400-1100 of an example of wireless communications between a provisioning system and a device to provision the device upon initialization. The communications may be performed by a device (e.g., the sensors 142), and a provisioning system (e.g., evaluation computer 126). In an aspect, diagrams 400-1100 include steps 1-80 for provisioning the device and creating a secure socket.

Figure 12:
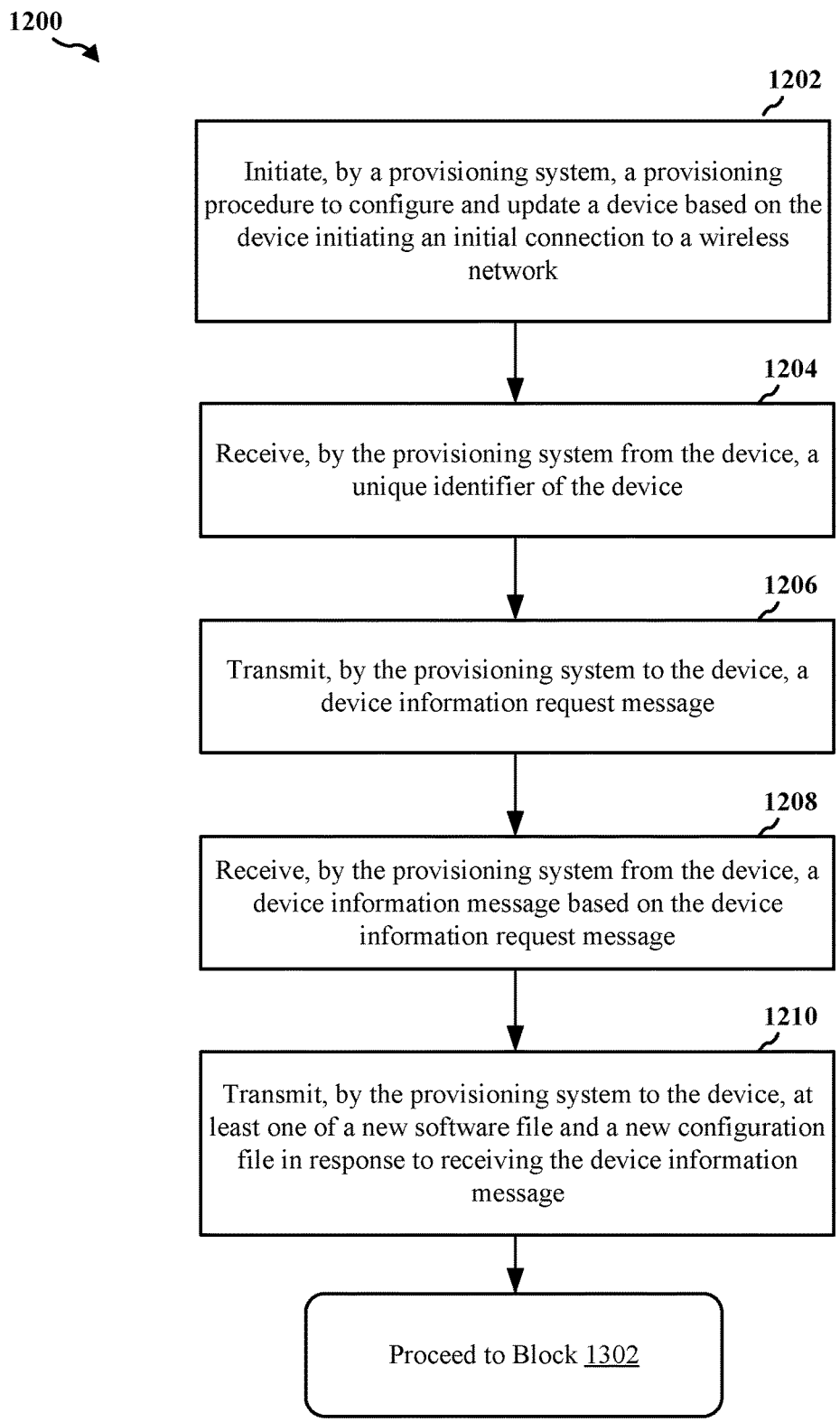
FIGS. 12 and 13 are flowcharts of a method of wireless communication of an example of provisioning a device.
Figure 13:
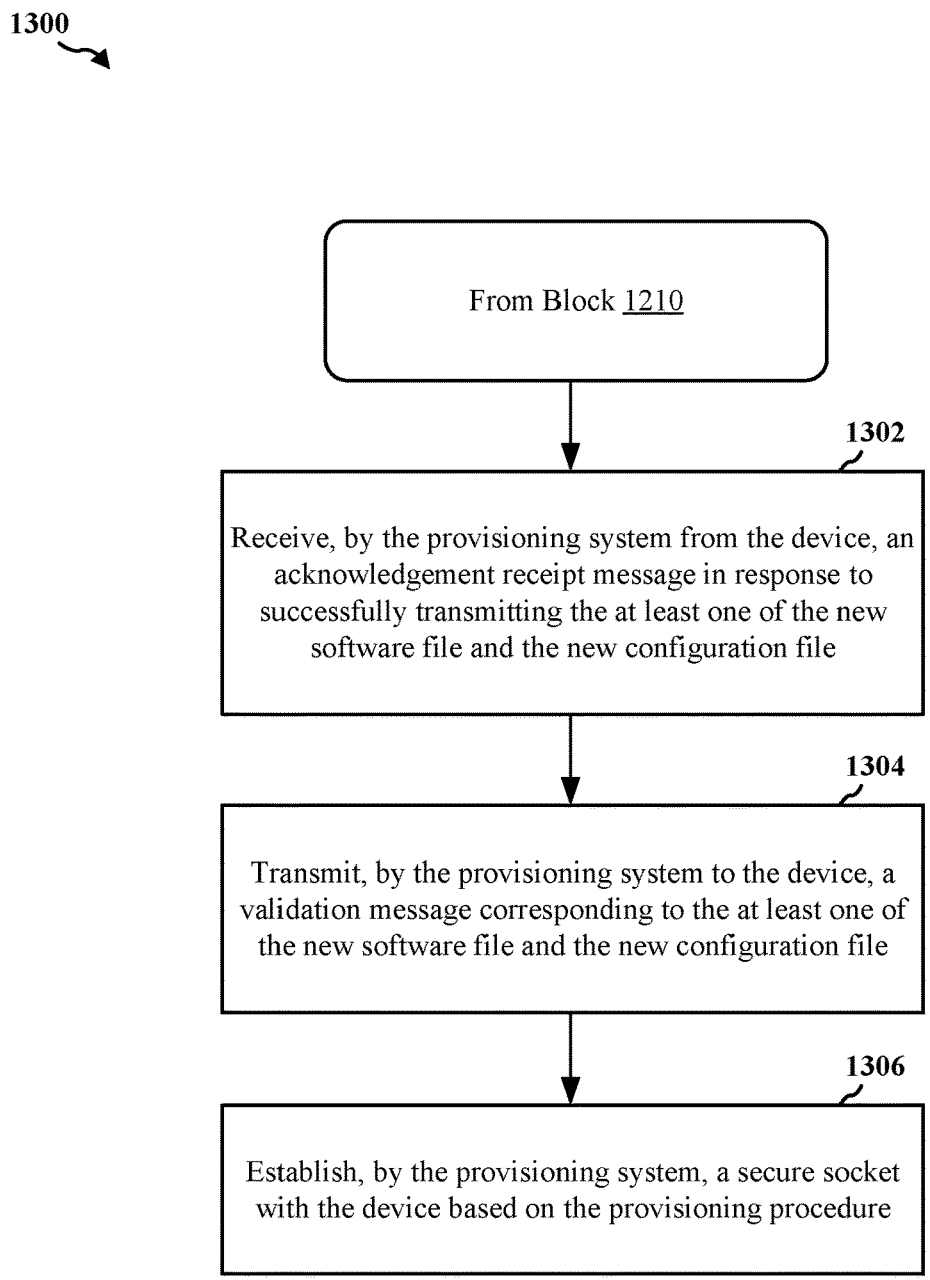

FIGS. 12 and 13 are flowcharts 1200 and 1300 of a method of wireless communication. The method may be performed by a provisioning system (e.g., computer device 340 of evaluation component 126) and a device (e.g., sensors 142).

At 1202, method 1200 includes initiating, by a provisioning system, a provisioning procedure to configure and update a device based on the device initiating an initial connection to a wireless network. In an aspect, the computer device 340 and/or provisioning component 370 may initiate a provisioning procedure to configure and update a device based on the device initiating an initial connection to a wireless network. For example, computer device 340 and/or provisioning component 370 may communicate with devices (e.g., sensors 142) via network interface 348.

At 1204, method 1200 includes receiving, by the provisioning system from the device, the unique identifier of the device. In an aspect, the computer device 340 and/or provisioning component 370 may receive, from the device, the unique identifier of the device.

At 1206, method 1200 includes transmitting, by the provisioning system to the device, a device information request message. In an aspect, the computer device 340 may transmit, to the device, a device information request message.

At 1208, method 1200 includes receiving, by the provisioning system from the device, a device information message based on the device information request message. In an aspect, the computer device 340 may receive, from the device, a device information message based on the device information request message.

At 1210, method 1200 includes transmitting, by the provisioning system to the device, at least one of a new software file and a new configuration file in response to receiving the device information message. In an aspect, the computer device 340 may transmit, to the device, at least one of a new software file and a new configuration file in response to receiving the device information message.

At 1302, method 1300 includes receiving, by the provisioning system from the device, an acknowledgement receipt message in response to successfully transmitting the at least one of the new software file and the new configuration file. In an aspect, the computer device 340 may receive, from the device, an acknowledgement receipt message in response to successfully transmitting the at least one of the new software file and the new configuration file.

At 1304, method 1300 includes transmitting, by the provisioning system to the device, a validation message corresponding to the at least one of the new software file and the new configuration file. In an aspect, the computer device 340 may transmit, to the device, a validation message corresponding to the at least one of the new software file and the new configuration file.

In an example of method 1200/1300, the unique identifier corresponds to a media access control (MAC) address.

In an example of method 1200/1300, the device information request message includes at least one of a software version and one or more configuration settings.

In an example of method 1200/1300, the device information request message is transmitted upon validation of the unique identifier In an example of method 1200/1300, the device information message includes at least one of a software version and one or more configuration settings.

In an example, method 1200/1300 includes receiving, by the provisioning system from the device, a validation confirmation message in response to transmitting the validation message; transmitting, by the provisioning system to the device, an application message for applying the at least one of the new software file and the new configuration file; receiving, by the provisioning system from the device, a confirmation message confirming application of the at least one of the new software file and the new configuration file.

In an example, method 1200/1300 includes transmitting, by the provisioning system to the device, a reboot message triggering the device to reboot; rebooting, by the device, in response to transmitting the reboot message from the provisioning system; receiving, by the provisioning system from the device, a reboot confirmation message in response to successfully rebooting the device; and receiving, by the provisioning system from the device, a second unique identifier of the device in response to rebooting the device.

In an example of method 1200/1300, the second unique identifier corresponds to a media access control (MAC) address.

In an example, method 1200/1300 includes transmitting, by the provisioning system to the device, a second device information request message; receiving, by the provisioning system from the device, a second device information message based on the second device information request message; and transmitting, by the provisioning system to the device, a second confirmation message confirming that the device and one or more children devices have correct software and configuration settings applied based on receiving the second device information.

In an example of method 1200/1300, the second device information request message includes at least one of a software version and one or more configuration settings.

In an example of method 1200/1300, the second device information request message is transmitted upon validation of the second unique identifier.

In an example of method 1200/1300, the second device information message includes at least one of a software version and one or more configuration settings.

In an example of method 1200/1300, the device corresponds to at least one of a pedestal, camera, or a people counter.

At 1306, method 1300 includes establishing, by the provisioning system, a secure socket with the device based on the provisioning procedure. In an aspect, the computer device 340 may establish a secure socket with the device based on the provisioning procedure.

In an example of method 1200/1300, establishing, by the provisioning system, the secure socket with the device based on the provisioning procedure further comprises establishing, by the provisioning system, the secure socket with the device based on the second confirmation message.

Figure 14:
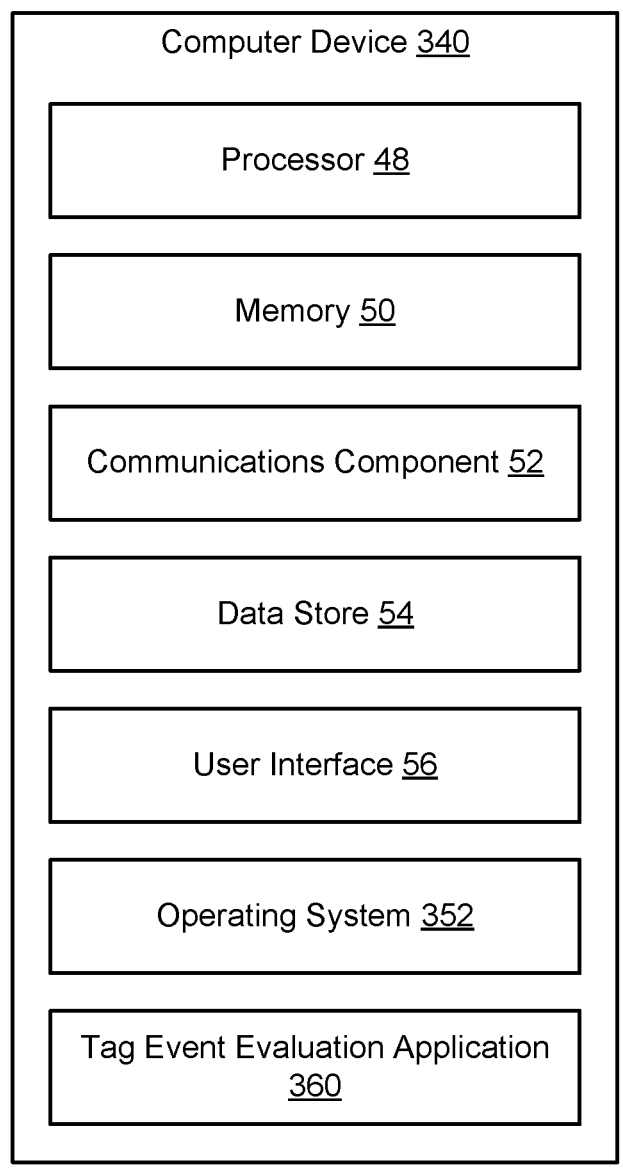
FIG. 14 is a schematic block diagram of an example computer device, in accordance with an implementation of the present disclosure.

Referring now to FIG. 14, illustrated is an example computer device 340 in accordance with an implementation, including additional component details as compared to FIG. 3. In one example, computer device 340 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 342.

In an example, computer device 340 may include memory 50 for storing instructions executable by the processor 48 for carrying out the functions described herein. In an implementation, for example, memory 50 may include memory 344. The memory 50 may include instructions for executing the provisioning application for executing the methods.

Further, computer device 340 may include a communications component 52 that provides for establishing and maintaining communications with one or more parties utilizing hardware, software, and services as described herein. Communications component 52 may carry communications between components on computer device 340, as well as between computer device 340 and external devices, such as devices located across a communications network and/or devices serially or locally connected to computer device 340. For example, communications component 52 may include one or more buses, and may further include transmit chain components and receive chain components associated with a transmitter and receiver, respectively, operable for interfacing with external devices.

Additionally, computer device 340 may include a data store 54, which can be any suitable combination of hardware and/or software, that provides for mass storage of information, databases, and programs employed in connection with implementations described herein. For example, data store 54 may be a data repository for operating system 352 and/or applications 354. The data store may include memory 344 and/or storage device 346.

Computer device 340 may also include a user interface component 56 operable to receive inputs from a user of computer device 340 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 352 and/or applications 354. In addition, processor 48 may execute operating system 352 and/or applications 354, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of communication, comprising:
    initiating, by a provisioning system, a provisioning procedure to configure and update a device based on the device initiating an initial connection to a wireless network;
    receiving, by the provisioning system from the device, a unique identifier of the device;
    transmitting, by the provisioning system to the device, a device information request message;
    receiving, by the provisioning system from the device, a device information message based on the device information request message;
    transmitting, by the provisioning system to the device, at least one of a new software file and a new configuration file in response to receiving the device information message;
    receiving, by the provisioning system from the device, an acknowledgement receipt message in response to successfully transmitting the at least one of the new software file and the new configuration file;
    transmitting, by the provisioning system to the device, a validation message corresponding to the at least one of the new software file and the new configuration file;
    receiving, by the provisioning system from the device, a validation confirmation message in response to transmitting the validation message;
    transmitting, by the provisioning system to the device, an application message for applying the at least one of the new software file and the new configuration file; and
    receiving, by the provisioning system from the device, a confirmation message confirming application of the at least one of the new software file and the new configuration file; and
    establishing, by the provisioning system, a secure socket with the device based on the provisioning procedure.

2. The method of claim 1, wherein the unique identifier corresponds to a media access control (MAC) address.

3. The method of claim 1, wherein the device information request message includes at least one of a software version and one or more configuration settings.

4. The method of claim 1, wherein the device information request message is transmitted upon validation of the unique identifier.

5. The method of claim 1, wherein the device information message includes at least one of a software version and one or more configuration settings.

6. The method of claim 1, further comprising:
transmitting, by the provisioning system to the device, a reboot message triggering the device to reboot;
rebooting, by the device, in response to transmitting the reboot message from the provisioning system;
receiving, by the provisioning system from the device, a reboot confirmation message in response to successfully rebooting the device; and
receiving, by the provisioning system from the device, a second unique identifier of the device in response to rebooting the device.

7. The method of claim 6, wherein the second unique identifier corresponds to a media access control (MAC) address.

8. The method of claim 6, further comprising:
transmitting, by the provisioning system to the device, a second device information request message;
receiving, by the provisioning system from the device, a second device information message based on the second device information request message; and
transmitting, by the provisioning system to the device, a second confirmation message confirming that the device and one or more children devices have correct software and configuration settings applied based on receiving the second device information.

9. The method of claim 8, wherein the second device information request message includes at least one of a software version and one or more configuration settings.

10. The method of claim 8, wherein the second device information request message is transmitted upon validation of the second unique identifier.

11. The method of claim 8, wherein the second device information message includes at least one of a software version and one or more configuration settings.

12. The method of claim 8, wherein establishing, by the provisioning system, the secure socket with the device based on the provisioning procedure further comprises establishing, by the provisioning system, the secure socket with the device based on the second confirmation message.

13. The method of claim 1, wherein the device corresponds to at least one of a pedestal, camera, or a people counter.

14. An apparatus for wireless communication, comprising:
a transceiver;
a memory configured to store instructions; and
one or more processors communicatively coupled with the transceiver and the memory, wherein the one or more processors are configured to:
initiate, by a provisioning system, a provisioning procedure to configure and update a device based on the device initiating an initial connection to a wireless network;
receive, by the provisioning system from the device, a unique identifier of the device;
transmit, by the provisioning system to the device, a device information request message;
receive, by the provisioning system from the device, a device information message based on the device information request message;
transmit, by the provisioning system to the device, at least one of a new software file and a new configuration file in response to receiving the device information message;
receive, by the provisioning system from the device, an acknowledgement receipt message in response to successfully transmitting the at least one of the new software file and the new configuration file;
transmit, by the provisioning system to the device, a validation message corresponding to the at least one of the new software file and the new configuration file;
receive, by the provisioning system from the device, a validation confirmation message in response to transmitting the validation message;
transmit, by the provisioning system to the device, an application message for applying the at least one of the new software file and the new configuration file; and
receive, by the provisioning system from the device, a confirmation message confirming application of the at least one of the new software file and the new configuration file; and
establish, by the provisioning system, a secure socket with the device based on the provisioning procedure.

15. The apparatus of claim 14, wherein the unique identifier corresponds to a media access control (MAC) address.

16. The apparatus of claim 14, wherein the device information request message includes at least one of a software version and one or more configuration settings.

17. The apparatus of claim 14, wherein the device information request message is transmitted upon validation of the unique identifier.

18. The method of claim 14, wherein the device information message includes at least one of a software version and one or more configuration settings.

19. A non-transitory computer-readable medium, comprising code executable by one or more processors to:
initiate, by a provisioning system, a provisioning procedure to configure and update a device based on the device initiating an initial connection to a wireless network;
receive, by the provisioning system from the device, a unique identifier of the device;
transmit, by the provisioning system to the device, a device information request message;
receive, by the provisioning system from the device, a device information message based on the device information request message;
transmit, by the provisioning system to the device, at least one of a new software file and a new configuration file in response to receiving the device information message;
receive, by the provisioning system from the device, an acknowledgement receipt message in response to successfully transmitting the at least one of the new software file and the new configuration file;
transmit, by the provisioning system to the device, a validation message corresponding to the at least one of the new software file and the new configuration file;
receive, by the provisioning system from the device, a validation confirmation message in response to transmitting the validation message;
transmit, by the provisioning system to the device, an application message for applying the at least one of the new software file and the new configuration file; and
receive, by the provisioning system from the device, a confirmation message confirming application of the at least one of the new software file and the new configuration file; and establish, by the provisioning system, a secure socket with the device based on the provisioning procedure.

\* \* \* \* \*